US012772338B2

(12) United States Patent
Fujishiro et al.

(10) Patent No.: US 12,772,338 B2
(45) Date of Patent: Oct. 20, 2026

(54) COMMUNICATION CONTROL METHOD, BASE STATION, AND USER EQUIPMENT

(71) Applicant: KYOCERA Corporation, Kyoto (JP)

(72) Inventors: Masato Fujishiro, Yokohama (JP); Mitsutaka Hata, Yokohama (JP)

(73) Assignee: KYOCERA Corporation, Kyoto (JP)

( * ) Notice: Subject to any disclaimer, the term of this patent is extended or adjusted under 35 U.S.C. 154(b) by 292 days.

(21) Appl. No.: 18/414,334

(22) Filed: Jan. 16, 2024

(65) Prior Publication Data

US 2024/0155733 A1 May 9, 2024

Related U.S. Application Data

(63) Continuation of application No. PCT/JP2022/027461, filed on Jul. 12, 2022.

(30) Foreign Application Priority Data

Jul. 16, 2021 (JP) ................................ 2021-118340

(51) Int. Cl.
*H04W 76/10* (2018.01)
*H04W 76/40* (2018.01)
*H04W 84/04* (2009.01)

(52) U.S. Cl.
CPC ........... *H04W 76/40* (2018.02); *H04W 76/10* (2018.02); *H04W 84/042* (2013.01)

(58) Field of Classification Search
CPC ....... H04W 4/06; H04W 76/10; H04W 76/11; H04W 76/40; H04W 84/042; H04W 88/10
USPC .......................................................... 370/329
See application file for complete search history.

(56) References Cited

U.S. PATENT DOCUMENTS

| | | | |
|---|---|---|---|
| 9,351,149 B2 | 5/2016 | Wang et al. | |
| 9,485,751 B2 | 11/2016 | Hayashi | |
| 11,510,178 B2 * | 11/2022 | Catovic ................ | H04W 76/40 |
| 2010/0080161 A1 | 4/2010 | Hayashi | |
| 2013/0010670 A1 | 1/2013 | Hayashi | |

(Continued)

FOREIGN PATENT DOCUMENTS

| | | |
|---|---|---|
| JP | 2016-538762 A | 12/2016 |
| WO | 2008/093472 A1 | 8/2008 |

OTHER PUBLICATIONS

Huawei, HiSilicon; "NR multicast broadcast enhancements"; 3GPP TSG RAN Rel-18 workshop; RWS-210446; Electronic Meeting; Jun. 28-Jul. 2, 2021; pp. 1-4.

(Continued)

*Primary Examiner* — Robert J Lopata
(74) *Attorney, Agent, or Firm* — Studebaker Brackett PLLC

(57) ABSTRACT

A communication control method used in a mobile communication system includes receiving, at a base station shared by a plurality of core networks from each of the plurality of core networks, an MBS service identifier indicating an MBS service provided by the corresponding one of the plurality of core networks; and transmitting, at the base station, MBS data belonging to the MBS service to a plurality of user equipments belonging to a plurality of Public Land Mobile Networks (PLMNs) corresponding to the plurality of core networks through multicast or broadcast. The MBS service identifier is a unique identifier independent of the plurality of PLMNs.

9 Claims, 12 Drawing Sheets

(56) References Cited

U.S. PATENT DOCUMENTS

| | | | | |
|---|---|---|---|---|
| 2023/0017217 | A1* | 1/2023 | Zhu | H04W 76/40 |
| 2024/0114592 | A1* | 4/2024 | Zhang | H04W 76/40 |

OTHER PUBLICATIONS

Ericsson et al.; "KI #1, Conclusion Update and Resolve EN on TMGI"; SA WG2 Meeting #143E; S2-2101410; Feb. 24-Mar. 9, 2021, Electronic, Elbonia; pp. 1-4.

* cited by examiner

| | Delivery mode 1 | Delivery mode 2 |
|---|---|---|
| Intended for | Multicast sessions<br>(High QoS requirement) | Broadcast sessions<br>(Low QoS requirement) |
| Reception in | Connected | Connected<br>IDLE/INACTIVE |
| Configuration signalling by | RRC Reconfiguration | BCCH<br>MCCH |

COMMUNICATION CONTROL METHOD, BASE STATION, AND USER EQUIPMENT

RELATED APPLICATIONS

The present application is a continuation based on PCT Application No. PCT/JP2022/027461, filed on Jul. 12, 2022, which claims the benefit of Japanese Patent Application No. 2021-118340 filed on Jul. 16, 2021. The content of which is incorporated by reference herein in their entirety.

TECHNICAL FIELD

The present disclosure relates to a communication control method, a base station, and a user equipment that are used in a mobile communication system.

BACKGROUND OF INVENTION

In 3rd Generation Partnership Project (3GPP) standards, technical specifications of New Radio (NR) being radio access technology of the fifth generation (5G) have been defined. NR has features such as high speed, large capacity, high reliability, and low latency, in comparison to Long Term Evolution (LTE) being radio access technology of the fourth generation (4G). Introduction of multicast broadcast services (MBS) into such a 5G system has been under study.

One base station or one cell may be shared by a plurality of core networks belonging to operators (Public Land Mobile Networks (PLMNs)) different from each other. In such a scenario, the following method has been proposed in which, when the same MBS service is provided from respective core networks via the base station, the base station transmits MBS data using radio resources common to a plurality of operators, to thereby reduce a use amount of radio resources for the MBS (see Non-Patent Document 1).

CITATION LIST

Non-Patent Literature

Non-Patent Document 1: 3GPP Contribution: RWS-210446, “NR multicast broadcast enhancements”

SUMMARY

In a first aspect, a communication control method is used in a mobile communication system. The communication control method includes receiving, at a base station shared by a plurality of core networks from each of the plurality of core networks, an MBS service identifier indicating an MBS service provided by the corresponding one of the plurality of core networks; and transmitting, at the base station, MBS data belonging to the MBS service to a plurality of user equipments belonging to a plurality of Public Land Mobile Networks (PLMNs) corresponding to the plurality of core networks through multicast or broadcast. The MBS service identifier is a unique identifier independent of the plurality of PLMNs.

In a second aspect, a base station is shared by a plurality of core networks in a mobile communication system. The base station includes a network communicator that receives, from each of the plurality of core networks, an MBS service identifier indicating an MBS service provided by the corresponding one of the plurality of core networks; and a wireless communicator that transmits MBS data belonging to the MBS service to a plurality of user equipments belonging to a plurality of PLMNs corresponding to the plurality of core networks through multicast or broadcast. The MBS service identifier is a unique identifier independent of the plurality of PLMNs.

In a third aspect, a communication control method is used in a mobile communication system. The communication control method includes transmitting, at a base station shared by a plurality of core networks, control information used for reception of an MBS traffic channel and/or reception of an MBS control channel to a plurality of user equipments belonging to a plurality of PLMNs corresponding to the plurality of core networks; and transmitting, at the base station, MBS data to the plurality of user equipments through multicast or broadcast by using the MBS traffic channel. The control information includes a PLMN identifier of each of the plurality of PLMNs.

In a fourth aspect, a base station is shared by a plurality of core networks in a mobile communication system. The base station includes a wireless communicator that transmits control information used for reception of an MBS traffic channel and/or reception of an MBS control channel to a plurality of user equipments belonging to a plurality of PLMNs corresponding to the plurality of core networks. The wireless communicator transmits MBS data to the plurality of user equipments through multicast or broadcast by using the MBS traffic channel. The control information includes a PLMN identifier of each of the plurality of PLMNs.

In a fifth aspect, a user equipment is used in a mobile communication system. The user equipment includes a wireless communicator that receives control information used for reception of an MBS traffic channel and/or reception of an MBS control channel from a base station shared by a plurality of core networks. The wireless communicator receives MBS data transmitted from the base station to a plurality of user equipments belonging to a plurality of PLMNs corresponding to the plurality of core networks through multicast or broadcast by using the MBS traffic channel. The control information includes a PLMN identifier of each of the plurality of PLMNs.

DESCRIPTION OF EMBODIMENTS

The current 3GPP technical specifications do not introduce a mechanism for facilitating an operation in which a base station transmits MBS data using radio resources common to a plurality of core networks (a plurality of PLMNs). Thus, it may be difficult to perform efficient MBS delivery.

In view of this, the present disclosure provides a communication control method, a base station, and a user equipment that enable efficient MBS delivery in a mobile communication system.

A mobile communication system according to an embodiment is described with reference to the drawings. In the description of the drawings, the same or similar parts are denoted by the same or similar reference signs.

First Embodiment

First, with reference to FIG. 1 to FIG. 9, the mobile communication system according to a first embodiment will be described.

Configuration of Mobile Communication System

Figure 1:
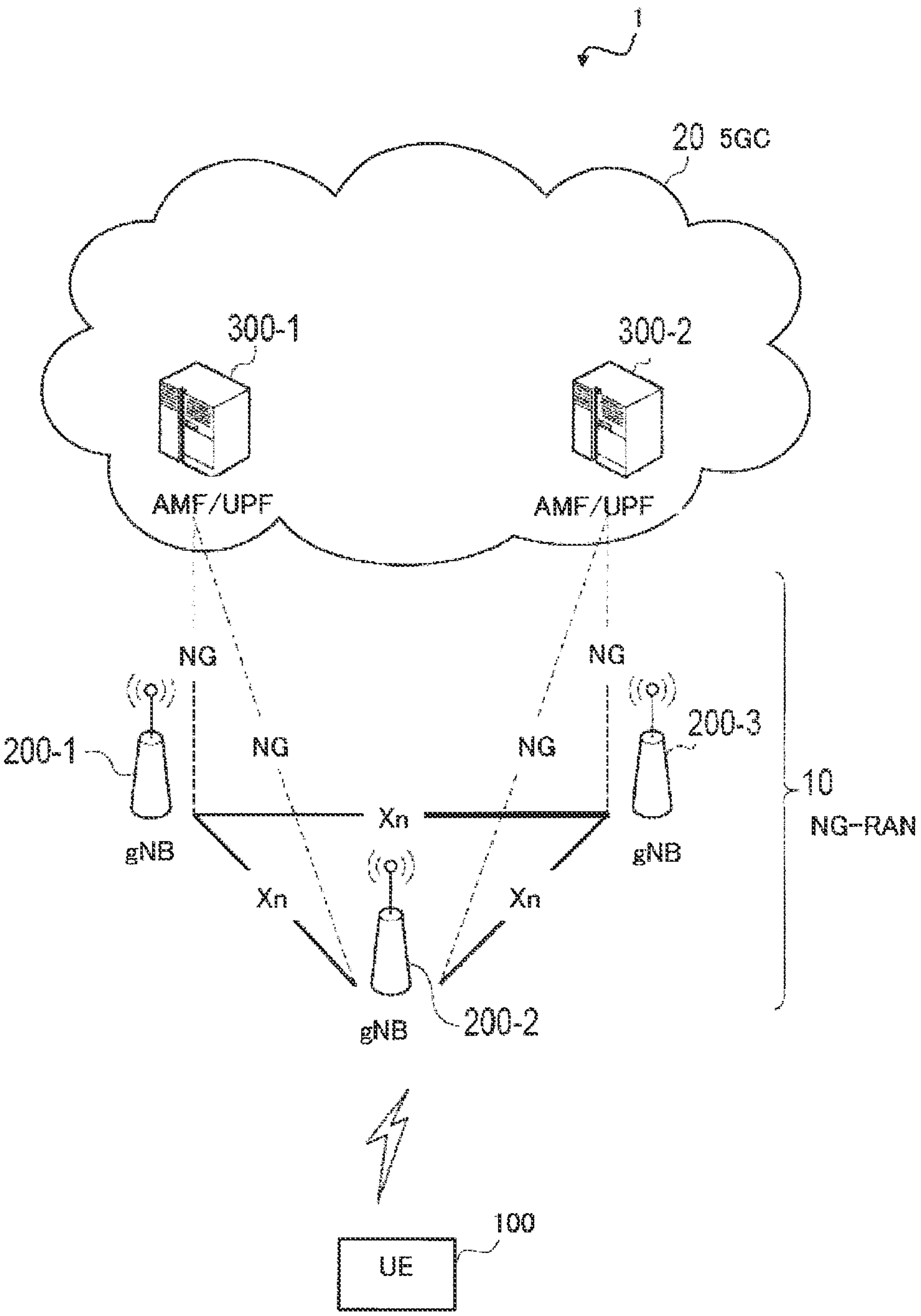
FIG. 1 is a diagram illustrating a configuration of a mobile communication system according to a first embodiment.

FIG. 1 is a diagram illustrating the configuration of the mobile communication system according to the first embodiment. A mobile communication system 1 complies with the 5th Generation System (5GS) of the 3GPP standard. The description below takes the 5GS as an example, but Long Term Evolution (LTE) system may be at least partially applied to the mobile communication system. A sixth generation (6G) system may be at least partially applied to the mobile communication system.

The mobile communication system 1 includes a User Equipment (UE) 100, a 5G radio access network (Next Generation Radio Access Network (NG-RAN)) 10, and a 5G Core Network (5GC) 20. The NG-RAN 10 may be hereinafter simply referred to as a RAN 10. The 5GC 20 may be simply referred to as a core network (CN) 20.

The UE 100 is a mobile wireless communication apparatus. The UE 100 may be any apparatus as long as utilized by a user. Examples of the UE 100 include a mobile phone terminal (including a smartphone) or a tablet terminal, a notebook PC, a communication module (including a communication card or a chipset), a sensor or an apparatus provided on a sensor, a vehicle or an apparatus provided on a vehicle (Vehicle UE), and a flying object or an apparatus provided on a flying object (Aerial UE).

The NG-RAN 10 includes base stations (referred to as "gNBs" in the 5G system) 200. The gNBs 200 are interconnected via an Xn interface which is an inter-base station interface. Each gNB 200 manages one or more cells. The gNB 200 performs wireless communication with the UE 100 that has established a connection to the cell of the gNB 200. The gNB 200 has a radio resource management (RRM) function, a function of routing user data (hereinafter simply referred to as "data"), a measurement control function for mobility control and scheduling, and the like. The "cell" is used as a term representing a minimum unit of a wireless communication area. The "cell" is also used as a term representing a function or a resource for performing wireless communication with the UE 100. One cell belongs to one carrier frequency.

Note that the gNB can be connected to an Evolved Packet Core (EPC) corresponding to a core network of LTE. An LTE base station can also be connected to the 5GC. The LTE base station and the gNB can be connected via an inter-base station interface.

The 5GC 20 includes an Access and Mobility Management Function (AMF) and a User Plane Function (UPF) 300. The AMF performs various types of mobility controls and the like for the UE 100. The AMF manages mobility of the UE 100 by communicating with the UE 100 by using Non-Access Stratum (NAS) signalling. The UPF controls data transfer. The AMF and the UPF are connected to the gNB 200 via an NG interface which is an interface between a base station and the core network.

Figure 2:
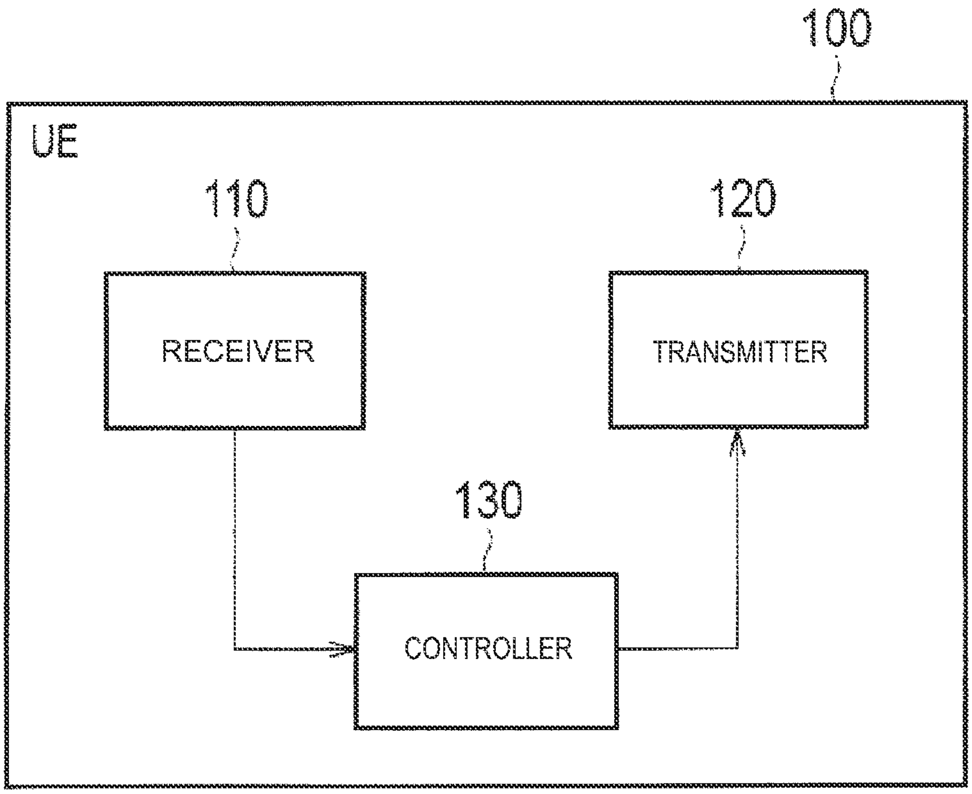
FIG. 2 is a diagram illustrating a configuration of a user equipment (UE) according to the first embodiment.

FIG. 2 is a diagram illustrating a configuration of the UE 100 (user equipment) according to the first embodiment. The UE 100 includes a receiver 110, a transmitter 120, and a controller 130. The receiver 110 and the transmitter 120 constitute a wireless communicator that performs wireless communication with the gNB 200.

The receiver 110 performs various types of reception under control of the controller 130. The receiver 110 includes an antenna and a reception device. The reception device converts a radio signal received through the antenna into a baseband signal (a reception signal) and outputs the resulting signal to the controller 130.

The transmitter 120 performs various types of transmission under control of the controller 130. The transmitter 120 includes an antenna and a transmission device. The transmission device converts a baseband signal (a transmission signal) output by the controller 130 into a radio signal and transmits the resulting signal through the antenna.

The controller 130 performs various types of control and processes in the UE 100. Such processes include processes of respective layers to be described later. The controller 130 includes at least one processor and at least one memory. The memory stores a program to be executed by the processor and information to be used for processing by the processor. The processor may include a baseband processor and a Central Processing Unit (CPU). The baseband processor performs modulation and demodulation, coding and decoding, and the like of a baseband signal. The CPU executes the program stored in the memory to thereby perform various types of processing.

Figure 3:
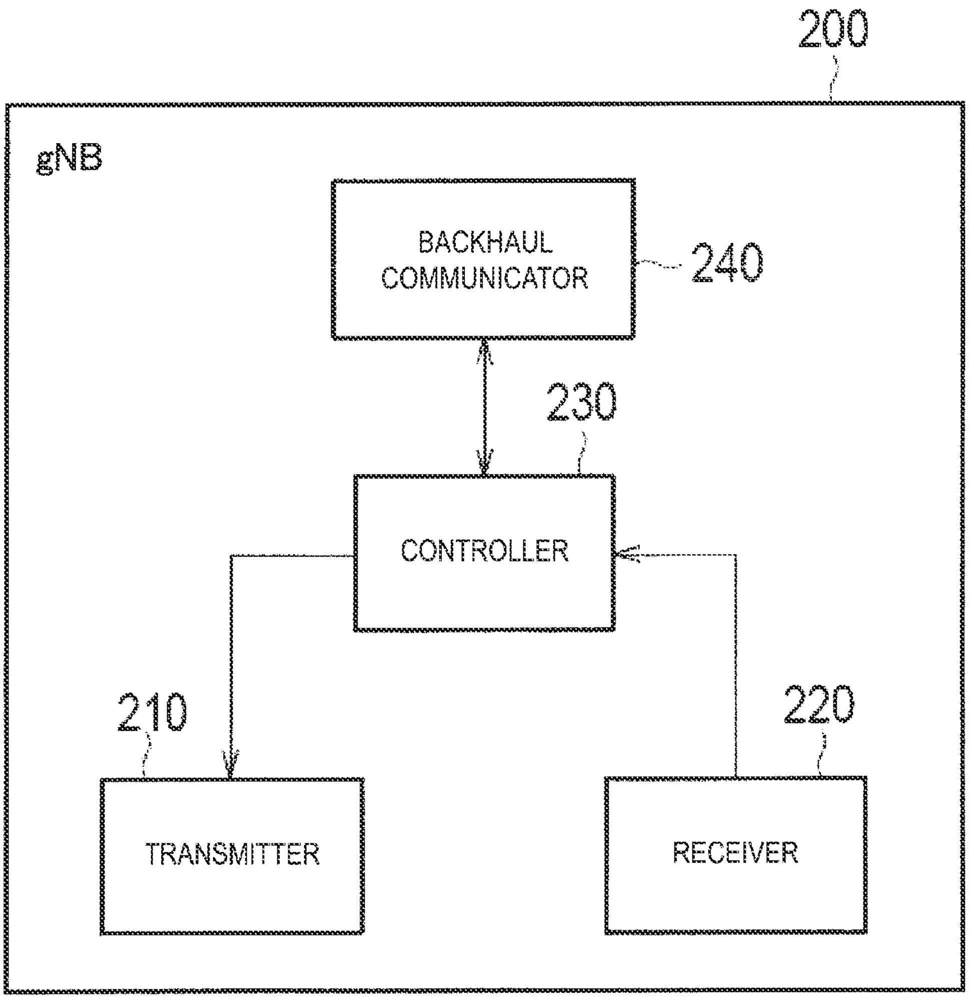
FIG. 3 is a diagram illustrating a configuration of a gNB (base station) according to the first embodiment.

FIG. 3 is a diagram illustrating a configuration of the gNB 200 (base station) according to the first embodiment. The gNB 200 includes a transmitter 210, a receiver 220, a controller 230, and a backhaul communicator 240. The transmitter 210 and the receiver 220 constitute a wireless communicator that performs wireless communication with the UE 100. The backhaul communicator 240 constitutes a network communicator that performs communication with the CN 20.

The transmitter 210 performs various types of transmission under control of the controller 230. The transmitter 210 includes an antenna and a transmission device. The transmission device converts a baseband signal (a transmission signal) output by the controller 230 into a radio signal and transmits the resulting signal through the antenna.

The receiver 220 performs various types of reception under control of the controller 230. The receiver 220 includes an antenna and a reception device. The reception device converts a radio signal received through the antenna into a baseband signal (a reception signal) and outputs the resulting signal to the controller 230.

The controller 230 performs various types of control and processes in the gNB 200. Such processes include processes of respective layers to be described later. The controller 230 includes at least one processor and at least one memory. The memory stores a program to be executed by the processor and information to be used for processing by the processor. The processor may include a baseband processor and a CPU. The baseband processor performs modulation and demodulation, coding and decoding, and the like of a baseband signal. The CPU executes the program stored in the memory to thereby perform various types of processing.

The backhaul communicator 240 is connected to a neighboring base station via the inter-base station interface. The backhaul communicator 240 is connected to the AMF/UPF 300 via the interface between a base station and the core network. Note that the gNB may include a Central Unit (CU) and a Distributed Unit (DU) (i.e., functions are divided), and both units may be connected via an F1 interface.

Figure 4:
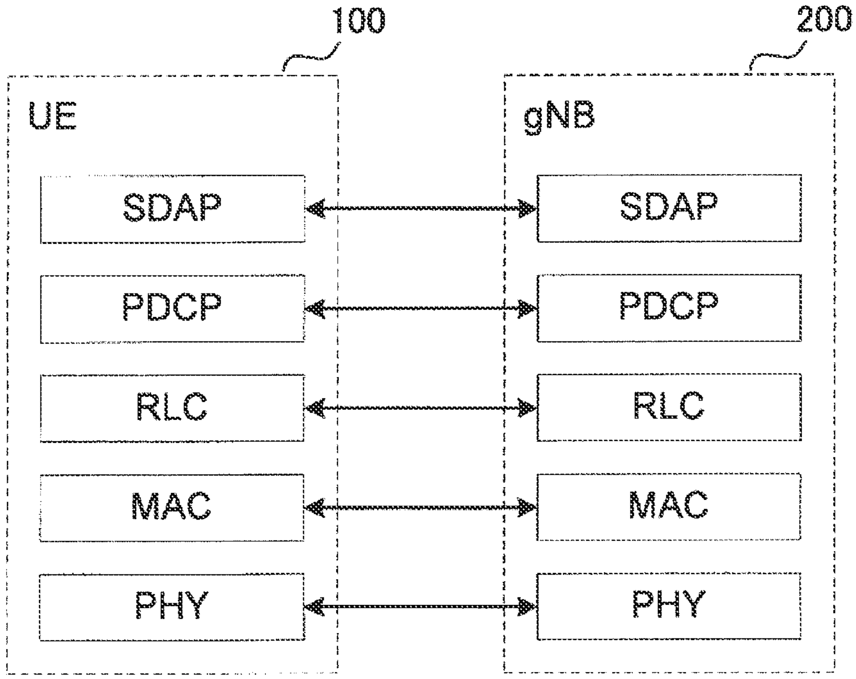
FIG. 4 is a diagram illustrating a configuration of a protocol stack of a radio interface of a user plane handling data.

FIG. 4 is a diagram illustrating a configuration of a protocol stack of a radio interface of a user plane handling data.

A radio interface protocol of the user plane includes a physical (PHY) layer, a Medium Access Control (MAC) layer, a Radio Link Control (RLC) layer, a Packet Data Convergence Protocol (PDCP) layer, and a Service Data Adaptation Protocol (SDAP) layer.

The PHY layer performs coding and decoding, modulation and demodulation, antenna mapping and demapping, and resource mapping and demapping. Data and control information are transmitted between the PHY layer of the UE 100 and the PHY layer of the gNB 200 via a physical channel.

The MAC layer performs priority control of data, retransmission processing through hybrid ARQ (HARQ: Hybrid Automatic Repeat reQuest), a random access procedure, and the like. Data and control information are transmitted between the MAC layer of the UE 100 and the MAC layer of the gNB 200 via a transport channel. The MAC layer of the gNB 200 includes a scheduler. The scheduler determines transport formats (transport block sizes, Modulation and Coding Schemes (MCSs)) in the uplink and the downlink and resource blocks to be allocated to the UE 100.

The RLC layer transmits data to the RLC layer on the reception side by using functions of the MAC layer and the PHY layer. Data and control information are transmitted between the RLC layer of the UE 100 and the RLC layer of the gNB 200 via a logical channel.

The PDCP layer performs header compression/decompression, encryption/decryption, and the like.

The SDAP layer performs mapping between an IP flow as the unit of Quality of Service (QoS) control performed by a core network and a radio bearer as the unit of QoS control performed by an Access Stratum (AS). Note that, when the RAN is connected to the EPC, the SDAP need not be provided.

Figure 5:
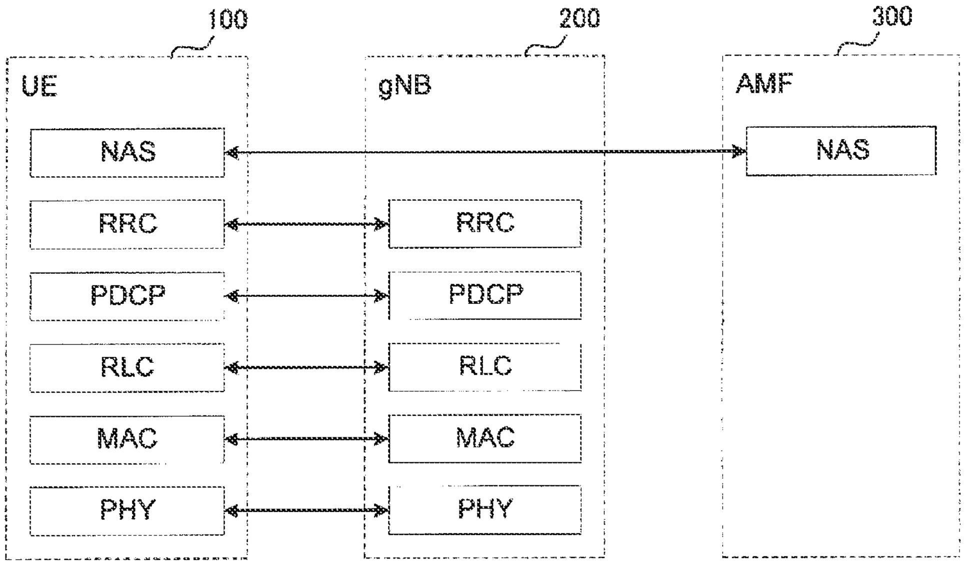
FIG. 5 is a diagram illustrating a configuration of a protocol stack of a radio interface of a control plane handling signalling (control signal).

FIG. 5 is a diagram illustrating a configuration of a protocol stack of a radio interface of a control plane handling signalling (a control signal).

The protocol stack of the radio interface of the control plane includes a Radio Resource Control (RRC) layer and a Non-Access Stratum (NAS) layer instead of the SDAP layer illustrated in FIG. 4.

RRC signalling for various configurations is transmitted between the RRC layer of the UE 100 and the RRC layer of the gNB 200. The RRC layer controls a logical channel, a transport channel, and a physical channel according to establishment, re-establishment, and release of a radio bearer. When a connection between the RRC of the UE 100 and the RRC of the gNB 200 (RRC connection) exists, the UE 100 is in an RRC connected state. When a connection between the RRC of the UE 100 and the RRC of the gNB 200 (RRC connection) does not exist, the UE 100 is in an RRC idle state. When the connection between the RRC of the UE 100 and the RRC of the gNB 200 is suspended, the UE 100 is in an RRC inactive state.

The NAS layer which is positioned upper than the RRC layer performs session management, mobility management, and the like. NAS signalling is transmitted between the NAS layer of the UE 100 and the NAS layer of the AMF 300.

Note that the UE 100 includes an application layer other than the protocol of the radio interface.

Overview of MBS

An overview of the MBS according to the first embodiment will be described. The MBS is a service in which the NG-RAN 10 can provide broadcast or multicast, i.e., Point To Multipoint (PTM) data transmission to the UE 100. Assumed use cases (service types) of the MBS include public safety communication, mission critical communication, Vehicle to Everything (V2X) communication, IPv4 or IPv6 multicast delivery, Internet Protocol TeleVision (IPTV), group communication, and software delivery.

A broadcast service provides a service to every UE 100 within a particular service area for an application not requiring highly reliable QoS. An MBS session used for the broadcast service is referred to as a broadcast session.

A multicast service provides a service not to every UE 100, but to a group of UEs 100 participating in the multicast service. An MBS session used for the multicast service is referred to as a multicast session. The multicast service can provide the same content to the group of UEs 100 through a method with higher radio efficiency than the broadcast service.

Figures 6, 7:
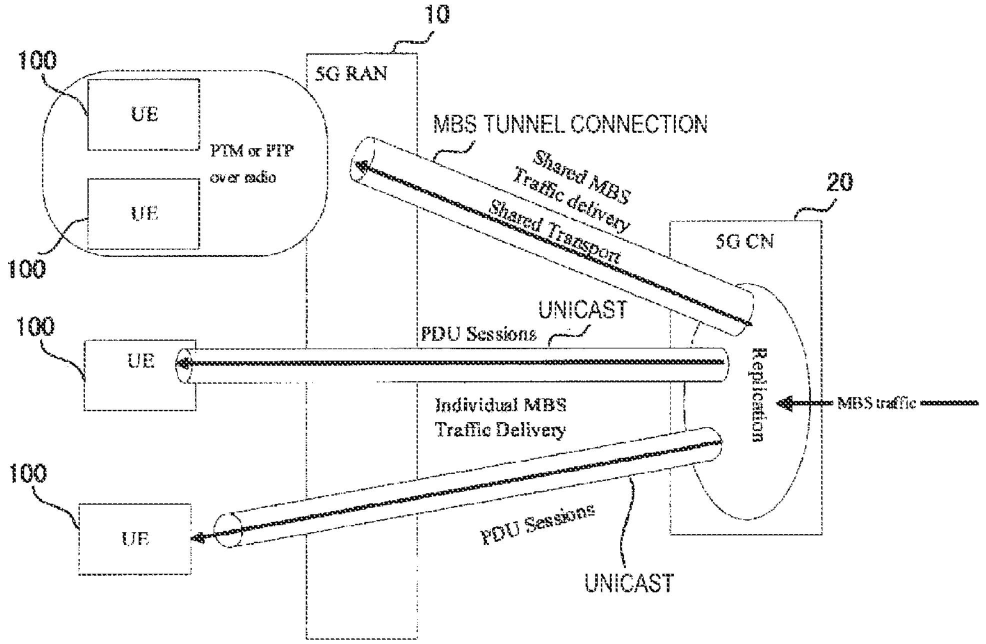
FIG. 6 is a diagram illustrating an overview of MBS traffic delivery according to the first embodiment.
FIG. 7 is a diagram illustrating delivery modes according to the first embodiment.

FIG. 6 is a diagram illustrating an overview of MBS traffic delivery according to the first embodiment.

As illustrated in FIG. 6, MBS traffic (MBS data) is delivered from a single data source (application service provider) to a plurality of UEs. The 5G CN (5GC) 20, which is a 5G core network, receives the MBS data from the application service provider and performs Replication of the MBS data to deliver the resultant.

From the perspective of the 5GC 20, two multicast delivery methods are possible: 5GC Shared MBS Traffic delivery and 5GC Individual MBS Traffic delivery.

In the 5GC individual MBS traffic delivery method, the 5GC 20 receives a single copy of MBS data packets and delivers individual copies of these MBS data packets to the individual UEs 100 via PDU sessions of the individual UEs 100. Thus, one PDU session for each UE 100 needs to be associated with a multicast session.

In the 5GC shared MBS traffic delivery method, the 5GC 20 receives a single copy of MBS data packets and delivers the single copy of the MBS packets to a RAN node (i.e., the gNB 200). The gNB 200 receives the MBS data packets via MBS tunnel connection and delivers those to one or more UEs 100.

From the perspective of the RAN (5G RAN) 10, two delivery methods are possible for radio transmission of the MBS data in the 5GC shared MBS traffic delivery method: a Point-to-Point (PTP) delivery method and a Point-to-Multipoint (PTM) delivery method. PTP means unicast, and PTM means multicast and broadcast.

In the PTP delivery method, the gNB 200 wirelessly delivers the individual copies of the MBS data packets to the individual UEs 100. On the other hand, in the PTM delivery method, the gNB 200 wirelessly delivers the single copy of the MBS data packets to a group of the UEs 100. The gNB 200 can dynamically determine whether to use the PTM or PTP delivery method as a method for delivering the MBS data to one UE 100.

The PTP delivery method and the PTM delivery method are mainly related to the user plane. Modes for controlling the MBS data delivery include two delivery modes: a first delivery mode and a second delivery mode. FIG. 7 is a diagram illustrating the delivery modes according to the first embodiment.

As illustrated in FIG. 7, the first delivery mode (Delivery mode 1) is a delivery mode that can be used by the UE 100 in the RRC connected state and is a delivery mode for high QoS requirements. The first delivery mode is used for multicast sessions among MBS sessions. Note that the first delivery mode may be used for broadcast sessions. The first delivery mode may be available to the UE 100 in the RRC idle state or the RRC inactive state.

In the first embodiment, MBS reception configuration in the first delivery mode is performed through UE-dedicated signalling. For example, the MBS reception configuration in the first delivery mode is performed through an RRC Reconfiguration message (or an RRC Release message), which is an RRC message unicast from the gNB 200 to the UE 100.

The MBS reception configuration includes MBS traffic channel configuration information (hereinafter referred to as "MTCH configuration information") about configuration of an MBS traffic channel carrying MBS data. The MTCH configuration information includes MBS session information relating to an MBS session and scheduling information of an MBS traffic channel corresponding to the MBS session.

Note that the MBS traffic channel is a type of logical channel and may be referred to as a Multicast Traffic Channel (MTCH). The MBS traffic channel is mapped to a Downlink Shared Channel (DL-SCH) being a type of transport channel.

The second delivery mode (Delivery mode 2) is a delivery mode that can be used not only by the UE 100 in the RRC connected state, but also by the UE 100 in the RRC idle state or the RRC inactive state and is a delivery mode for low QoS requirements. The second delivery mode is used for broadcast sessions among MBS sessions. However, the second delivery mode may also be applicable to multicast sessions.

An MBS reception configuration in the second delivery mode is performed through broadcast signalling. For example, MBS reception configuration in the second delivery mode is performed through a logical channel broadcast from the gNB 200 to the UEs 100, such as a Broadcast Control Channel (BCCH) and/or a Multicast Control Channel (MCCH). Hereinafter, such a control channel may be referred to as an MBS control channel. The UE 100 can receive the BCCH and the MCCH, using a dedicated RNTI defined in technical specifications in advance, for example.

The network can provide different MBS services for different MBS sessions. The MBS session is identified by at least one selected from the group consisting of a Temporary Mobile Group Identity (TMGI), a session identifier, and a group Radio Network Temporary Identifier (RNTI). The TMGI and/or the session identifier is referred to as an MBS session identifier (MBS session ID). The TMGI, the session identifier, and the group RNTI are collectively referred to as MBS session information.

Operation of Mobile Communication System

Figure 8:
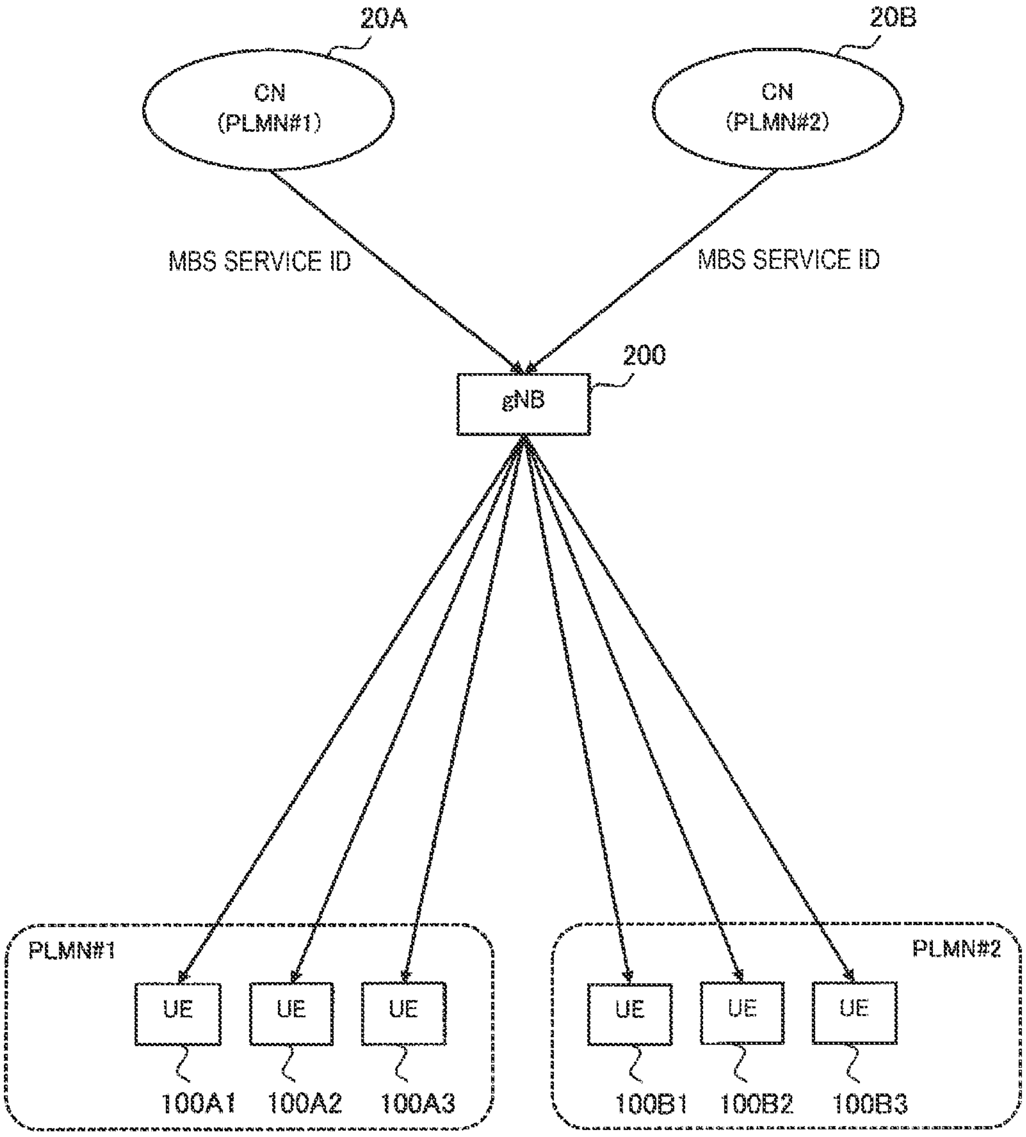
FIG. 8 is a diagram for illustrating an operation according to the first embodiment.

Operation of the mobile communication system 1 according to the first embodiment will be described. FIG. 8 is a diagram for illustrating an operation according to the first embodiment.

A scenario is assumed in which one gNB 200 (one cell) is shared by a plurality of CNs 20 belonging to operators (PLMNs) different from each other. Although FIG. 8 illustrates an example in which one gNB 200 (one cell) is shared by two CNs 20, namely a CN 20A and a CN 20B, one gNB 200 (one cell) may be shared by three or more CNs 20. The CN 20A belongs to PLMN #1, and the CN 20B belongs to PLMN #2. Here, "#1" and "#2" each mean a PLMN identifier (PLMN ID).

In the cell of the gNB 200, such a plurality of UEs 100 exist that receive the MBS service (MBS data) provided through multicast or broadcast or that are interested in the reception. Here, a UE 100A1 to a UE 100A3 belong to PLMN #1, and a UE 100B1 to a UE 100B3 belong to PLMN #2. The UE 100A1 to the UE 100A3 are hereinafter simply referred to as "UE 100A" when not being distinguished from one another, and the UE 100B1 to the UE 100B3 are hereinafter simply referred to as "UE 100B" when not being distinguished from one another. Note that, although an example is illustrated in which the number of UEs 100 belonging to each PLMN is three, the number of UEs 100 belonging to each PLMN may be one, two, or four or more.

In such a scenario, when the same MBS service is provided from the respective CNs 20 via the gNB 200, the gNB 200 transmits the MBS data using radio resources (that is, the same radio resources) common to PLMN #1 and PLMN #2. Thus, a use amount of radio resources for MBS delivery can be reduced as compared to a case in which the gNB 200 transmits the MBS data using radio resources (that is, different radio resources) specific to PLMN #1 and PLMN #2.

In the first embodiment, the gNB 200 shared by the plurality of CNs 20 (specifically, the gNB 200 managing the cell shared by the plurality of PLMNs) receives MBS service identifiers (MBS service IDs) indicating the MBS services provided by the CNs 20 respectively from the plurality of CNs 20. In the example of FIG. 8, the gNB 200 receives the MBS service ID of the MBS service provided by the CN 20A from the CN 20A and receives the MBS service ID of the MBS service provided by the CN 20B from the CN 20B.

The MBS service ID is a unique identifier (that is, a global identifier) independent of the PLMN. The MBS service ID may be referred to as an MBS application ID. The gNB 200 can uniquely identify the MBS service provided by the CN 20, based on the MBS service ID received from the CN 20. Thus, the gNB 200 can specify whether the MBS services provided by the CN 20A and the CN 20B are the same, based on the MBS service IDs respectively received from the CN 20A and the CN 20B.

In response to reception of the same MBS service IDs from the CN 20A and the CN 20B, the gNB 200 transmits the MBS data belonging to the MBS services, using radio resources common to PLMN #1 and PLMN #2. Thus, when the MBS services provided by the CN 20A and the CN 20B are the same, the use amount of radio resources for MBS delivery can be reduced.

When the MBS services provided by the CN 20A and the CN 20B are the same, the gNB 200 may acquire the MBS data from one CN 20 out of the CN 20A and the CN 20B. Thus, the gNB 200 need not acquire the MBS data from the other CN 20, and accordingly the use amount of backhaul communication resources can also be reduced.

The gNB 200 may receive an MBS session start message including the MBS service ID from each of the CN 20A and the CN 20B. For example, when the CN 20A starts to provide the MBS service, the gNB 200 receives the MBS session start message including the MBS service ID of the MBS service from the CN 20A. In the same and/or similar manner, when the CN 20B starts to provide the MBS service, the gNB 200 receives the MBS session start message including the MBS service ID of the MBS service from the CN 20B. Thus, the gNB 200 can efficiently recognize the MBS services respectively provided by the CN 20A and the CN 20B. Note that the session start message may be an MBS session start-scheduled message. The gNB 200 may broadcast the MBS session start-scheduled message to the UEs 100, using an SIB (for example, an MBS-SIB or the like). The UE 100 may perform cell selection or cell reselection, based on the SIB.

The gNB 200 may transmit notification information indicating whether provision of the MBS service is to be provided to one of the CNs 20, based on the MBS service IDs respectively received from the CN 20A and the CN 20B. For example, in response to reception of the same MBS service identifiers from the CN 20A and the CN 20B, the gNB 200 may transmit the notification information indicating that provision of the MBS service is unnecessary to one CN 20 out of the CN 20A and the CN 20B. Thus, the use amount of backhaul communication resources used and the load of the CNs 20 for acquisition of the MBS data can be reduced.

The gNB 200 may receive, from at least one CN 20, i.e., the CN 20A and/or the CN 20B, information indicating whether sharing of radio resources and/or CN resources for transmitting the MBS data with another CN 20 is permitted. The information may be associated with the MBS service ID. The information may further include one of the PLMN identifier with which sharing of resources is permitted and/or information indicating the CN 20 (or the PLMN) that provides data (that is, the gNB 200 acquires the data) when resources are shared. In response to a fact that the gNB 200 receives the same MBS service identifiers from the CN 20A and the CN 20B and the CN 20A and the CN 20B permit sharing of radio resources and/or CN resources, the gNB 200 transmits the MBS data belonging to the MBS services, using radio resources (that is, the same radio resources) common to PLMN #1 and PLMN #2. When at least one CN 20, i.e., the CN 20A and/or the CN 20B, does not permit sharing of radio resources and/or CN resources for transmitting the MBS data with another CN 20, the gNB 200 may not be allowed to perform MBS delivery using radio resources (that is, the same radio resources) common to PLMN #1 and PLMN #2.

Figure 9:
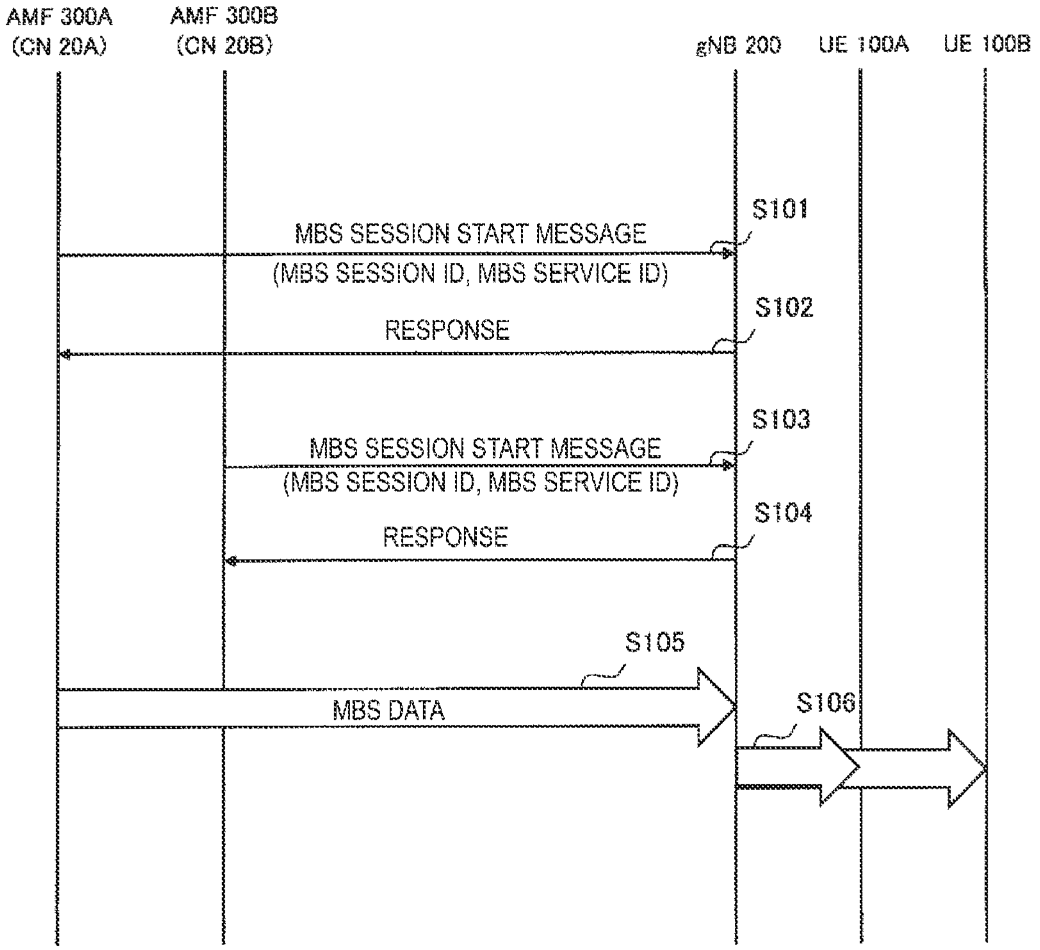
FIG. 9 is a diagram illustrating an example of an operation according to the first embodiment.

FIG. 9 is a diagram illustrating an example of an operation according to the first embodiment. Note that not necessarily all the steps in FIG. 9 need to be executed, and only a part of the steps may be executed. The order of the steps in FIG. 9 may be changed.

In Step S101, in order to start to provide the MBS service in PLMN #1, an AMF 300A included in the CN 20A transmits, to the gNB 200, an MBS session start message including the MBS session identifier (MBS session ID) corresponding to the MBS service and the MBS service ID for uniquely identifying the MBS service.

Here, the MBS session ID is a PLMN-specific identifier. Thus, even when the CN 20A and the CN 20B provide the same MBS services, the MBS session IDs may be different between the CN 20A and the CN 20B.

The MBS session start message is a message transmitted and received on an NG interface, and is, for example, an NG-AP MBS Session Start (Activation) message. Note that the gNB 200 may be notified of the MBS service ID, using a message other than the MBS session start message.

In Step S102, the gNB 200 that has received the MBS session start message from the AMF 300A may transmit a response message to the AMF 300A. Here, the gNB 200 does not detect a fact that the MBS service provided by the CN 20A is also provided by another CN 20, and thus the gNB 200 transmits a positive response message to the AMF 300A. In response to reception of the positive response message from the gNB 200, the CN 20A may start to provide the MBS service and start to transmit the MBS data to the gNB 200.

In Step S103, in order to start to provide the MBS service in PLMN #2, an AMF 300B included in the CN 20B transmits, to the gNB 200, an MBS session start message including an MBS session ID corresponding to the MBS service and the MBS service ID for uniquely identifying the MBS service. Here, the MBS service provided by the CN 20B is the same as the MBS service provided by the CN 20A. Thus, the MBS service ID transmitted by the AMF 300B in Step S103 is the same as the MBS service ID transmitted by the AMF 300A in Step S101.

Each of the AMF 300A and the AMF 300B may include information (permission information) indicating whether sharing of radio resources (or backhaul and CN resources) with another PLMN is permitted in the MBS session start message to thereby perform transmission.

Note that each of the AMF 300A and the AMF 300B (or the CN 20A and the CN 20B to which the AMF 300A and the AMF 300B respectively belong, or another network function (for example, an SMF) belonging to the CN 20A or the CN 20B) may acquire the MBS service ID from an MBS application server via an Application Programming Interface (API), for example. Such an API may be provided by a Network Exposure Function (NEF).

The AMF 300A and/or the AMF 300B may conduct a negotiation on sharing of radio resources and/or CN resources with the MBS application server. For example, the AMF 300A and/or the AMF 300B may notify the MBS application server of being able to share its CN resources with another CN (another PLMN) and/or an identifier of another CN (another PLMN) permitting the sharing. The MBS application server may transmit, to the AMF 300A and/or the AMF 300B, information indicating the AMF 300 that provides the MBS data (that is, information indicating a master-side network of the MBS service provision) and/or information of the AMF 300 that does not provide the MBS data (that is, information of a secondary-side network of the MBS service provision: for example, a PLMN identifier).

Because the MIBS service ID received in Step S103 is the same as the MIBS service ID received in Step S101, the gNB 200 that has received the MBS session start message from the AMF 300B detects that the MBS service that the CN 20B is to start to provide is to be provided or is being provided by the CN 20A, and determines not to acquire the MBS data belonging to the MBS service from the CN 20B.

In Step S104, the gNB 200 transmits a response message to the AMF 300B. Here, because the gNB 200 detects that the CN 20A also provides the MBS service to be provided by the CN 20B, the gNB 200 transmits a response message indicating that provision of the MBS service is unnecessary to the AMF 300B. The response message may include at least one selected from the group consisting of information indicating that the MBS session is already being provided in another PLMN, information indicating that MBS tunnel connection of the MBS session is unnecessary, and information indicating that data transfer is unnecessary (to be stopped or suspended) although MBS tunnel connection of the MBS session is established. In response to reception of the response message from the gNB 200, the CN 20B cancels provision of the MBS service, and does not transmit the MBS data to the gNB 200.

The gNB 200 may transmit such a response message only when the CN 20A permits resource sharing. Alternatively, the gNB 200 may make a resource sharing permission request to the AMF 300A at this stage, and only when the AMF 300 grants permission, the gNB 200 may transmit the response message.

In Step S105, the CN 20A transmits the MBS data belonging to the MBS service to the gNB 200. The gNB 200 receives the MBS data.

In Step S106, the gNB 200 transmits the MBS data to the UE 100A and the UE 100B through multicast or broadcast, using radio resources (that is, the same radio resources) common to PLMN #1 and PLMN #2. Each of the UE 100A and the UE 100B receives the MBS data.

Note that the present operation sequence presupposes that the CN 20A (PLMN #1) permits resource sharing with another CN (another PLMN). However, a case in which the CN 20A (PLMN #1) does not permit resource sharing with another CN (another PLMN) may also be assumed. In such a case, the gNB 200 may notify (request) the AMF 300A that data transfer of the MBS session is to be stopped (suspended) and may permit (request) the AMF 300B to start data transfer of the MBS session. Prior to such an operation, the gNB 200 may make an inquiry to the AMF 300B as to whether resource sharing is permitted.

As described above, in the first embodiment, the gNB 200 shared by the plurality of CNs 20 (the plurality of PLMNs) receives the MBS service ID for uniquely identifying the MBS service from each of the plurality of CNs 20 and determines whether the plurality of CNs 20 provide the same MBS service. Then, when the gNB 200 determines that the plurality of CNs 20 provide the same MBS service, the gNB 200 acquires the MBS data belonging to the MBS service from only one CN 20, and transmits the MBS data through multicast or broadcast, using radio resources common to the plurality of PLMNs. Thus, efficient MBS delivery can be performed in the mobile communication system 1.

Second Embodiment

With reference to FIG. 10 to FIG. 13, a second embodiment will be described, mainly regarding differences from the first embodiment described above. The second embodiment mainly assumes the second delivery mode (Delivery mode 2). The configuration of the mobile communication system 1 is the same as and/or similar to that of the first embodiment described above.

Figure 10:
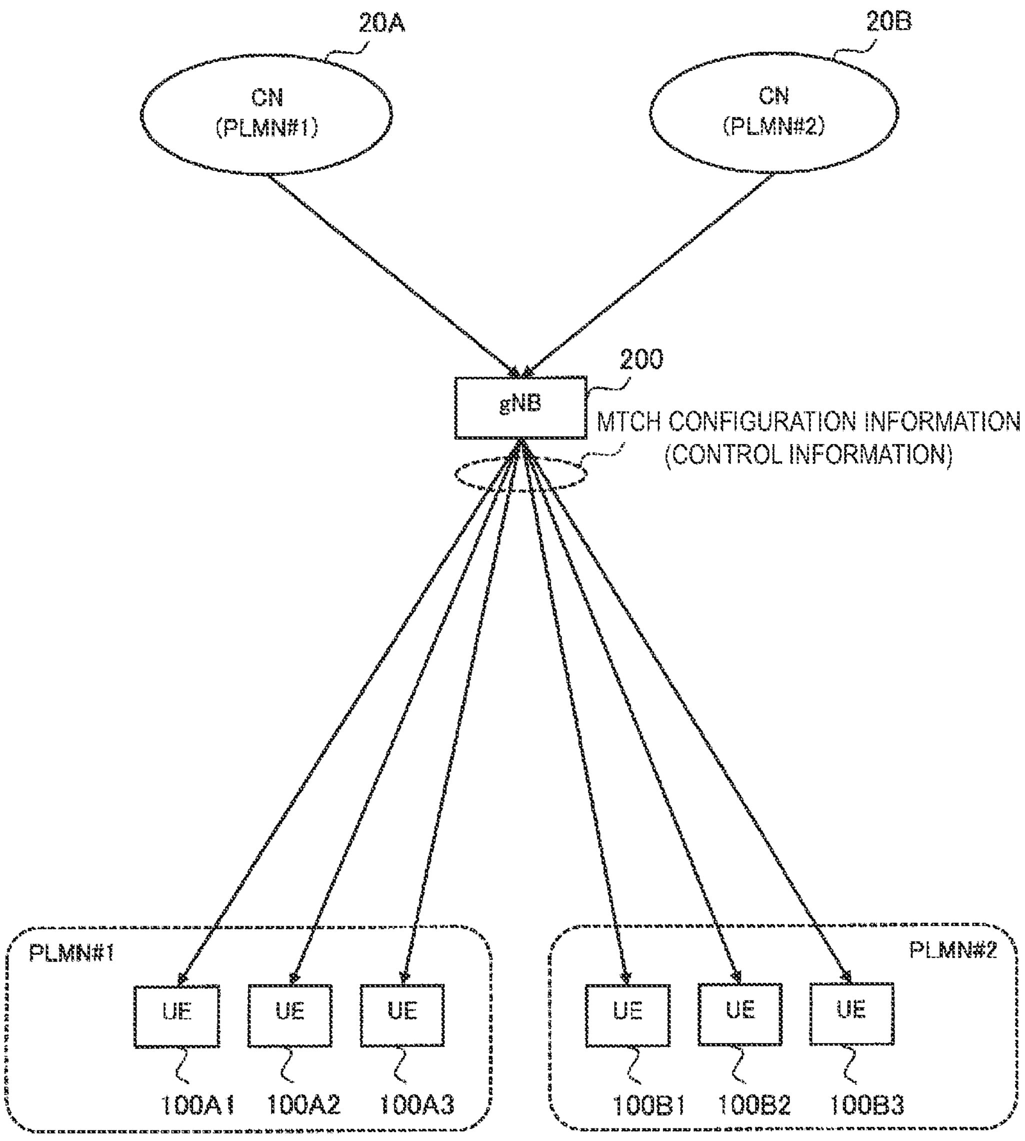
FIG. 10 is a diagram for illustrating an operation according to a second embodiment.

Operation of the mobile communication system 1 according to the second embodiment will be described. The operation according to the second embodiment may presuppose the operation according to the first embodiment described above. FIG. 10 is a diagram for illustrating an operation according to the second embodiment.

As illustrated in FIG. 10, the gNB 200 transmits the MBS traffic channel configuration information (MTCH configuration information) used for reception of the MIBS traffic channel (MTCH) to the UEs 100 through broadcast on the MBS control channel (for example, the MCCH). The MTCH configuration information includes the MBS session ID and MTCH scheduling information associated with the MBS session ID. Based on the MTCH configuration information, the UE 100 acquires the MTCH scheduling information associated with the MBS session ID of the MBS service that the UE 100 is to receive and receives the MTCH. Note that the MTCH configuration information may be referred to as PTM configuration information.

However, as described above, the MBS session ID is a PLMN-specific identifier. Thus, for example, when the UE 100B belonging to PLMN #2 receives the MBS service provided by the CN 20A belonging to PLMN #1, the UE 100B may not be able to correctly interpret the MBS session ID of PLMN #1. Thus, the UE 100B may not be able to receive the MTCH, based on the MTCH configuration information. Conversely, also when the UE 100A belonging to PLMN #1 receives the MBS service provided by the CN 20B belonging to PLMN #2, the same and/or similar problem may occur.

In the second embodiment, the gNB 200 shared by the plurality of CNs 20 (the CN 20A and the CN 20B) transmits the control information (MTCH configuration information) used for reception of the MTCH to the plurality of UEs 100 (the UE 100A and the UE 100B) belonging to the plurality of PLMNs (PLMN #1 and PLMN #2) corresponding to the plurality of CNs 20. The MTCH configuration information includes the PLMN identifier of each of the plurality of PLMNs. Specifically, the MTCH configuration information includes a plurality of sets of the MBS session ID and the PLMN identifier (PLMN ID). That is, the MTCH configuration information includes the MBS session ID for each PLMN. Thus, the UE 100 can identify the MBS session ID of the PLMN to which the UE 100 belongs in the MTCH configuration information and can correctly acquire the MTCH scheduling information.

Figure 11:
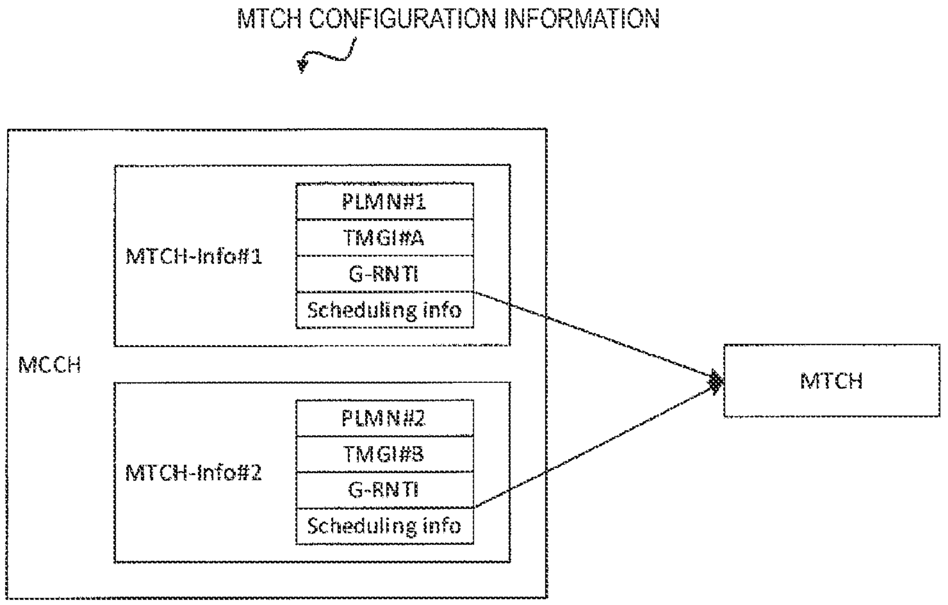
FIG. 11 is a diagram illustrating an example of Multicast Traffic Channel (MTCH) configuration information according to the second embodiment.

FIG. 11 is a diagram illustrating an example of the MTCH configuration information according to the second embodiment. Here, the MTCH configuration information is transmitted on the MCCH.

The MTCH configuration information includes MTCH configuration (MTCH-Info) for each PLMN. For example, the MTCH configuration information includes MTCH configuration for PLMN #1 (MTCH-Info #1) and MTCH configuration for PLMN #2 (MTCH-Info #2). Here, the MTCH configuration for PLMN #1 (MTCH-Info #1) and the MTCH configuration for PLMN #2 (MTCH-Info #2) indicate the same MTCH (that is, the same MBS service).

Each MTCH configuration (MTCH-Info) includes the PLMN ID, the MBS session ID (TMGI), the G-RNTI, and the MTCH scheduling information (Scheduling info). For example, the MTCH configuration for PLMN #1 (MTCH-Info #1) includes PLMN ID "#1" of PLMN #1, MBS session ID "TMGI #A" of PLMN #1, the G-RNTI, and the MTCH scheduling information (Scheduling info). The MTCH configuration for PLMN #2 (MTCH-Info #2) includes PLMN ID "#2" of PLMN #2, MBS session ID "TMGI #B" of PLMN #2, the G-RNTI, and the MTCH scheduling information (Scheduling info).

The UE 100A belonging to PLMN #1 receives the MTCH configuration information illustrated in FIG. 11. The UE 100A is interested in receiving IBS session ID "TMGI #A" of PLMN #1. In this case, the UE 100A identifies the MTCH configuration (MTCH-Info #1) including PLMN ID "#1" of PLMN #1. Because the identified MTCH configuration (MTCH-Info #1) includes MBS session ID "TMGI #A", the UE 100A recognizes that the MBS service of "TMGI #A" is to be provided, and attempts to receive the MTCH, based on the G-RNTI and the MTCH scheduling information (Scheduling info) included in the identified MTCH configuration (MTCH-Info #1). Specifically, the UE 100A monitors a PDCCH at a timing indicated by the MTCH scheduling information (Scheduling info), and attempts to decode the PDCCH, using the G-RNTI. Then, the UE 100A receives the MBS data on radio resources (PDSCH) indicated by the PDCCH.

In the same and/or similar manner, the UE 100B belonging to PLMN #2 receives the MTCH configuration information illustrated in FIG. 11. The UE 100B is interested in receiving MBS session ID "TMGI #B" of PLMN #2. In this case, the UE 100B identifies the MTCH configuration (MTCH-Info #2) including PLMN ID "#2" of PLMN #2. Because the identified MTCH configuration (MTCH-Info #2) includes MBS session ID "TMGI #B", the UE 100B recognizes that the MBS service of "TMGI #B" is to be provided, and attempts to receive the MTCH, based on the G-RNTI and the MTCH scheduling information (Scheduling info) included in the identified MTCH configuration (MTCH-Info #2). Specifically, the UE 100B monitors a PDCCH at a timing indicated by the MTCH scheduling information (Scheduling info), and attempts to decode the PDCCH, using the G-RNTI. Then, the UE 100B receives the MBS data on radio resources (PDSCH) indicated by the PDCCH.

Here, when the gNB 200 transmits the MBS data using radio resources common to PLMN #1 and PLMN #2, the G-RNTI and the MTCH scheduling information (Scheduling info) included in the MTCH configuration (MTCH-Info #1) of PLMN #1 and the G-RNTI and the MTCH scheduling information (Scheduling info) included in the MTCH configuration (MTCH-Info #2) of PLMN #2 have the same contents. Such duplex transmission of the same information leads to reduction of use efficiency of radio resources.

Figure 12:
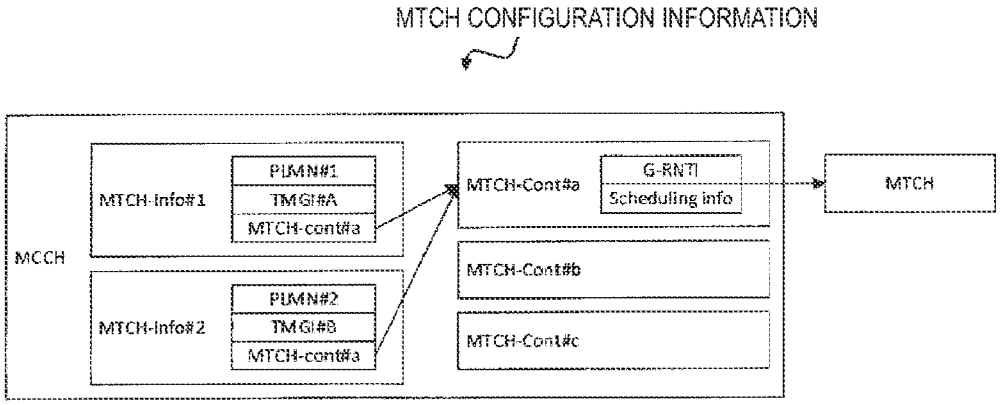
FIG. 12 is a diagram illustrating another example of the MTCH configuration information according to the second embodiment.

Thus, the G-RNTI and the MTCH scheduling information (Scheduling info) may be unified in the MTCH configuration information. FIG. 12 is a diagram illustrating another example of the MTCH configuration information according to the second embodiment. Here, the MTCH configuration information is transmitted on the MCCH.

As illustrated in FIG. 12, the MTCH configuration information includes MTCH-Cont as an information element common to PLMN #1 and PLMN #2. FIG. 12 illustrates an example in which the MTCH configuration information includes three pieces of MTCH-Cont, namely MTCH-Cont #a, MTCH-Cont #b, and MTCH-Cont #c. Here, "#a", "#b", and "#c" are each an index of MTCH-Cont. The MTCH configuration (MTCH-Info #1) of PLMN #1 includes index "#a" of MTCH-Cont, instead of the G-RNTI and the MTCH scheduling information (Scheduling info). In the same and/or similar manner, the MTCH configuration (MTCH-Info #2) of PLMN #2 includes index "#a" of MTCH-Cont, instead of the G-RNTI and the MTCH scheduling information (Scheduling info).

The UE 100A belonging to PLMN #1 receives the MTCH configuration information illustrated in FIG. 12. The UE 100A is interested in receiving IBS session ID "TMGI #A" of PLMN #1. In this case, the UE 100A identifies the MTCH configuration (MTCH-Info #1) including PLMN ID "#1" of PLMN #1. Because the identified MTCH configuration (MTCH-Info #1) includes MBS session ID "TMGI #A", the UE 100A recognizes that the MBS service of "TMGI #A" is to be provided, acquires the G-RNTI and the MTCH scheduling information (Scheduling info) in MTCH-Cont #a, based on index "#a" of MTCH-Cont included in the identified MTCH configuration (MTCH-Info #1), and attempts to receive the MTCH.

In the same and/or similar manner, the UE 100B belonging to PLMN #2 receives the MTCH configuration information illustrated in FIG. 12. The UE 100B is interested in receiving MBS session ID "TMGI #B" of PLMN #2. In this case, the UE 100B identifies the MTCH configuration (MTCH-Info #2) including PLMN ID "#2" of PLMN #2. Because the identified MTCH configuration (MTCH-Info #2) includes MBS session ID "TMGI #B", the UE 100B recognizes that the MBS service of "TMGI #B" is to be provided, acquires the G-RNTI and the MTCH scheduling information (Scheduling info) in MTCH-Cont #a, based on index "#a" of MTCH-Cont included in the identified MTCH configuration (MTCH-Info #2), and attempts to receive the MTCH.

In the second embodiment, the MCCH (MTCH configuration information) may include neighboring cell information and/or neighboring frequency information for each PLMN. For example, MTCH-Info #1 may include information of a neighboring cell and/or a neighboring frequency providing the MBS service in PLMN #1. MTCH-Info #2 may include information of a neighboring cell and/or a neighboring frequency providing the MBS service in PLMN #2.

Figure 13:
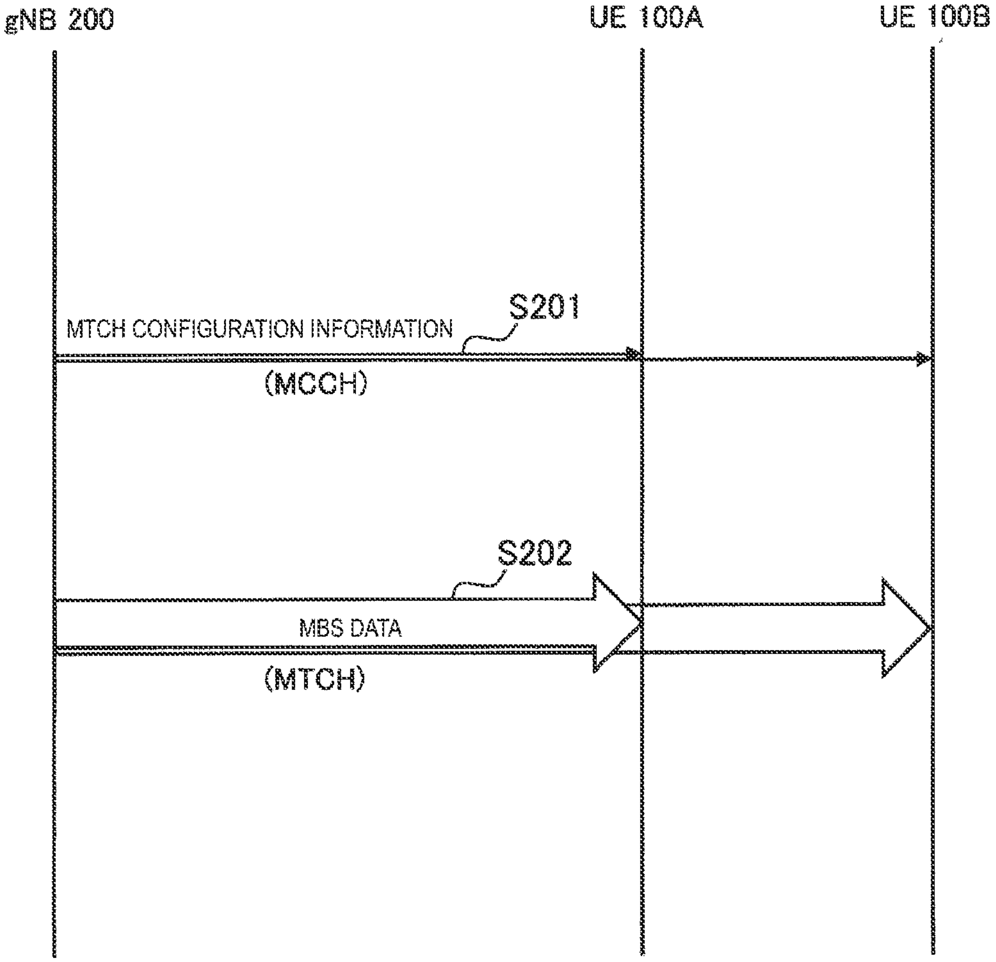
FIG. 13 is a diagram illustrating an example of an operation according to the second embodiment.

FIG. 13 is a diagram illustrating an example of an operation according to the second embodiment. Note that not necessarily all the steps in FIG. 13 need to be executed, and only a part of the steps may be executed.

The gNB 200 determines to transmit the MBS data of different PLMNs (different IBS sessions) in the same MIBS service on the same radio resources (the same MTCH).

In Step S201, the gNB 200 transmits the MTCH configuration information on the MCCH, for example. As described above, the MTCH configuration information includes a plurality of MTCH configurations. Each MTCH configuration includes the PLMN ID and the TMGI (MBS session ID). Each MTCH configuration further includes the G-RNTI and the scheduling information. Each of the UE 100A and the UE 100B receives the MTCH configuration information.

In Step S202, the gNB 200 transmits the MBS data on the MTCH in accordance with scheduling indicated by the MTCH configuration information. The UE 100A receives the MTCH of TMGI #A of PLMN #1, based on the MTCH configuration information received in Step S201. The UE 100B receives the MTCH of TMGI #B of PLMN #2, based on the MTCH configuration information received in Step S201. Note that the UE 100A and the UE 100B actually receive the same MTCH.

As described above, in the second embodiment, the gNB 200 shared by the plurality of CNs 20 (the CN 20A and the CN 20B) transmits the MTCH configuration information used for reception of the MTCH to the plurality of UEs 100 (the UE 100A and the UE 100B) belonging to the plurality of PLMNs (PLMN #1 and PLMN #2) corresponding to the plurality of CNs 20. The MTCH configuration information includes a plurality of sets of the MBS session ID and the PLMN ID. That is, the MTCH configuration information includes the MBS session ID for each PLMN. Thus, the UE 100 can identify the MBS session ID of the PLMN to which the UE 100 belongs in the MTCH configuration information and can correctly receive the MTCH.

Note that the second embodiment can be applied also when the same MTCH is not used. That is, the second embodiment can be applied to a scenario in which the gNB 200 is shared by the plurality of CNs 20 (the CN 20A and the CN 20B).

Variation of Second Embodiment

Figure 14:
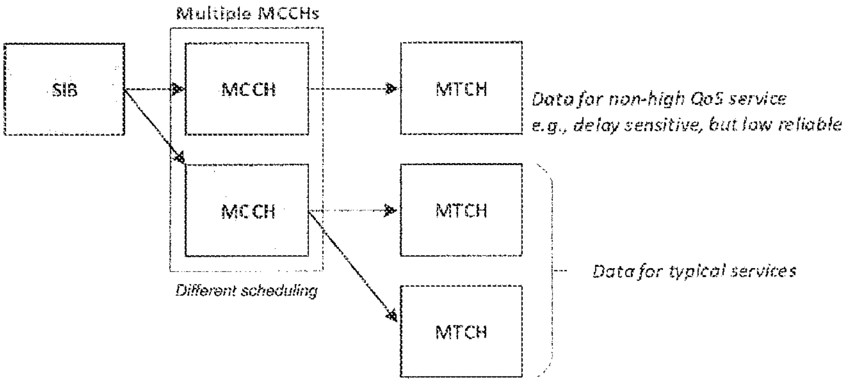
FIG. 14 is a diagram illustrating an example of a plurality of Multicast Control Channels (MCCHs) according to a variation of the second embodiment.
Figure 15:
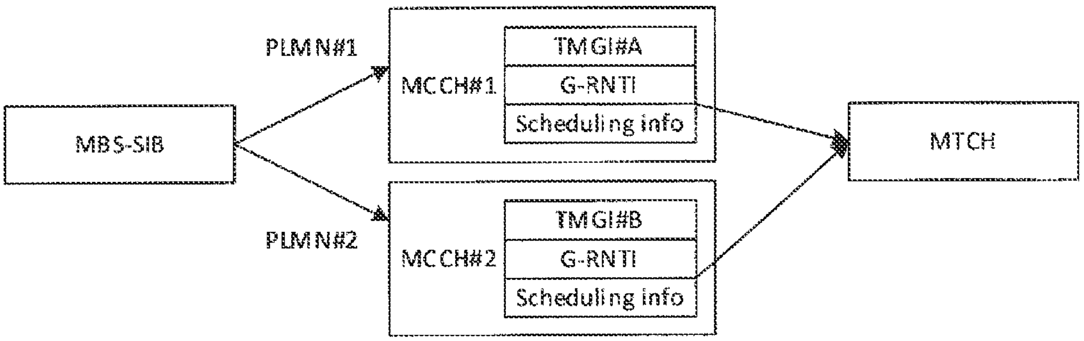
FIG. 15 is a diagram illustrating an example of an MBS-SIB and the MTCH configuration information according to the variation of the second embodiment.
Figure 16:
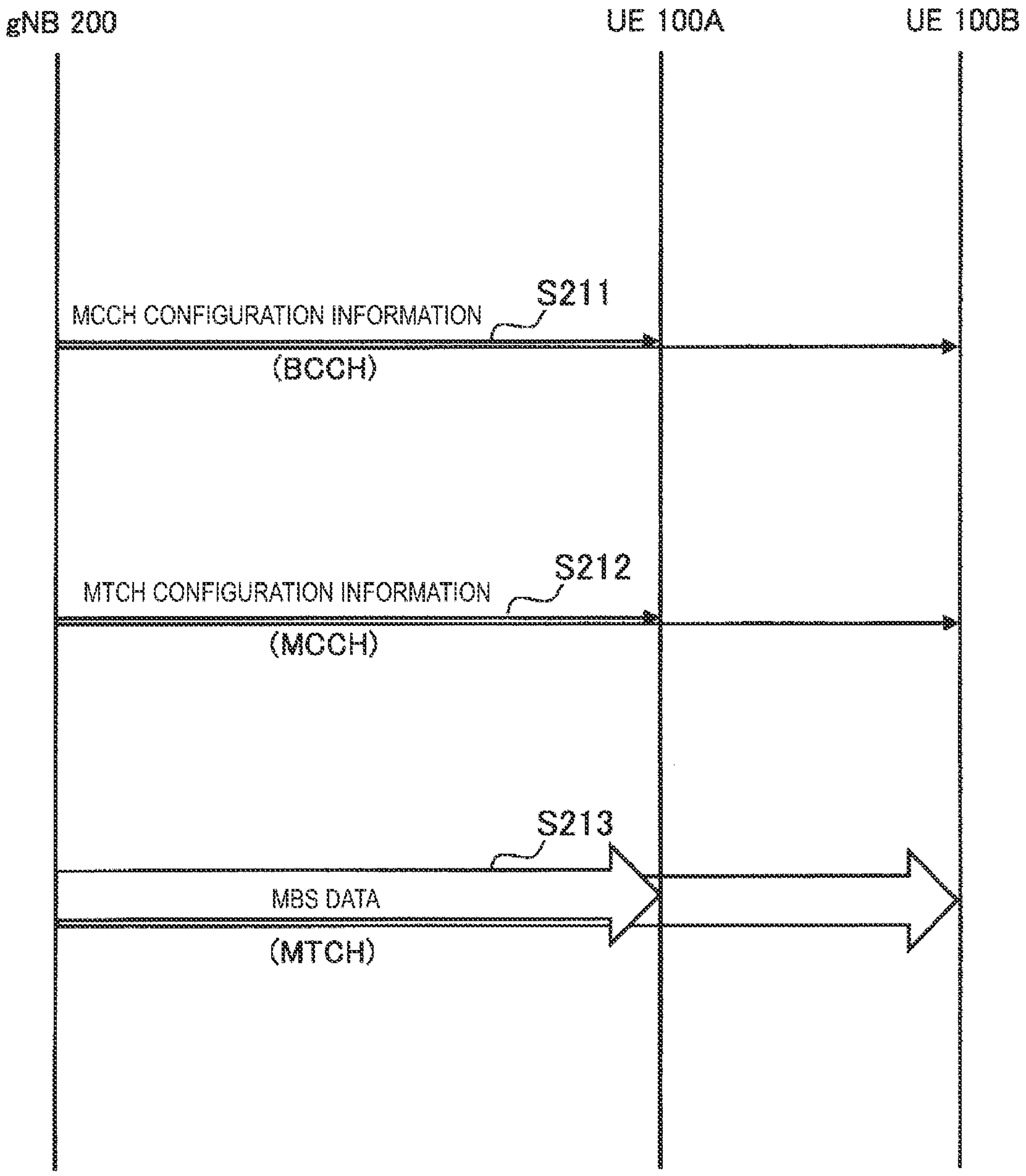
FIG. 16 is a diagram illustrating an example of an operation according to the variation of the second embodiment.

With reference to FIG. 14 to FIG. 16, a variation of the second embodiment will be described, mainly regarding differences from the second embodiment described above. The present variation assumes that a plurality of MCCHs are provided in one cell of the gNB 200. The MCCH is provided for each PLMN. That is, the MCCH is specific to the PLMN.

FIG. 14 is a diagram illustrating an example of a plurality of MCCHs according to the present variation.

As illustrated in FIG. 14, the gNB 200 provides MBS control channel configuration information, specifically MCCH configuration information (scheduling information), to the UE 100, using a system information block (SIB) transmitted on the BCCH. Such an SIB may be hereinafter referred to as an MBS-SIB. The UE 100 receives the MCCH (that is, the MTCH configuration information) based on the MBS-SIB received from the gNB 200, and receives the MTCH (that is, the MBS data) based on the received MCCH. In the present variation, the gNB 200 configures a plurality of MCCHs (Multiple MCCHs) in one cell of the gNB 200. The MCCHs may have scheduling (for example, transmission periods) different from each other.

FIG. 15 is a diagram illustrating an example of the MBS-SIB and the MTCH configuration information according to the present variation.

As illustrated in FIG. 15, the MBS-SIB includes a plurality of sets of the PLMN ID and an MCCH ID (MBS control channel identifier). That is, the MBS-SIB includes the MCCH ID for each PLMN. The MCCH ID is an identifier for uniquely identifying the MCCH. The MBS-SIB may include the MCCH configuration information (scheduling information) associated with the MCCH ID.

The UE 100A belonging to PLMN #1 receives the MBS-SIB illustrated in FIG. 15. The UE 100A identifies MCCH ID “#1” associated with PLMN ID “#1” of PLMN #1 based on the MBS-SIB and receives the MCCH (MTCH configuration information) indicated by MCCH ID “#1”. Subsequent operation is the same as and/or similar to that of the second embodiment described above.

The UE 100B belonging to PLMN #2 receives the MBS-SIB illustrated in FIG. 15. The UE 100B identifies MCCH ID “#2” associated with PLMN ID “#2” of PLMN #2 based on the MBS-SIB and receives the MCCH (MTCH configuration information) indicated by MCCH ID “#2”. Subsequent operation is the same as and/or similar to that of the second embodiment described above.

FIG. 16 is a diagram illustrating an example of an operation according to the present variation. Note that not necessarily all the steps in FIG. 16 need to be executed, and only a part of the steps may be executed.

The gNB 200 determines to transmit the MBS data of different PLMNs (different MBS sessions) in the same MBS service on the same resources (the same MTCH).

In Step S211, the gNB 200 transmits the MBS-SIB. As described above, the MBS-SIB includes information for associating the PLMN ID and the MCCH ID. Each of the UE 100A and the UE 100B receives the MBS-SIB.

In Step S212, the gNB 200 transmits a plurality of MCCHs. Each MCCH includes the MTCH configuration information, that is, the TMGI, the G-RNTI, and the MTCH scheduling information. Each MCCH includes the MCCH ID. Each of the UE 100A and the UE 100B receives the MCCH corresponding to the PLMN to which each of the UE 100A and the UE 100B belongs, based on the MBS-SIB received in Step S211.

In Step S213, the gNB 200 transmits the MBS data on the MTCH in accordance with scheduling indicated by the MTCH configuration information. The UE 100A receives the MTCH of TMGI #A of PLMN #1, based on the MCCH received in Step S212. The UE 100B receives the MTCH of TMGI #B of PLMN #2, based on the MCCH received in Step S212. The UE 100A and the UE 100B actually receive the same MTCH.

Although the present variation assumes a case in which the MCCH is specific to the PLMN, the present variation may assume the MCCH independent of the PLMN. For example, when Free-to-Air (FTA), Receive Only Mode (ROM), or the like is assumed, the MBS-SIB need not include the PLMN ID. Alternatively, the MBS-SIB may include information indicating that the MCCH is independent of the PLMN (for example, ROM=true).

Other Embodiments

In the embodiments described above, the MBS data may be encrypted (for example, IPsec). It is also assumed that such encryption is performed with a security key specific to the PLMN. When the MBS data provided by the PLMN is encrypted, even when the UE 100 belonging to a PLMN different from the PLMN receives the MBS data, the UE 100 may not be able to decode (decrypt) the MBS data. Thus, the CN 20 that transmits such encrypted MBS data to the gNB 200 may provide a security key to the UE 100 via the gNB 200. For example, the CN 20 notifies the gNB 200 of a security key in Step S101 or S103 in FIG. 9, and the gNB 200 notifies the UE 100 of the security key using an RRC message, for example. Alternatively, the CN 20 may notify the UE 100 of the security key using NAS signalling, or the UE 100 may be notified of the security key from an application layer.

In the embodiments described above, the PLMN may be a Non-Public Network (NPN). The PLMN ID may be replaced with an NPN ID. The PLMN and the NPN may Share the RAN.

The operation flows described above can be separately and independently implemented, and also be implemented in combination of two or more of the operation flows. For example, some of the steps in one operation flow may be applied to another operation flow. Some of the steps of one operation flow may be replaced with some of the steps of another operation flow.

In the embodiments and examples described above, an example in which the base station is an NR base station (i.e., a gNB) is described; however, the base station may be an LTE base station (i.e., an eNB) or a 6G base station. The base station may be a relay node such as an Integrated Access and Backhaul (IAB) node. The base station may be a Distributed Unit (DU) of the IAB node. The user equipment may be a Mobile Termination (MT) of the IAB node.

A program causing a computer to execute each of the processes performed by the UE 100 or the gNB 200 may be provided. The program may be recorded in a computer readable medium. Use of the computer readable medium enables the program to be installed on a computer. Here, the computer readable medium on which the program is recorded may be a non-transitory recording medium. The non-transitory recording medium is not particularly limited, and may be, for example, a recording medium such as a CD-ROM or a DVD-ROM. Circuits for executing processing performed by the UE 100 or the gNB 200 may be integrated, and at least a part of the UE 100 or the gNB 200 may be implemented as a semiconductor integrated circuit (chipset, System on a chip (SoC)).

The phrases "based on" and "depending on" used in the present disclosure do not mean "based only on" and "only depending on," unless specifically stated otherwise. The phrase "based on" means both "based only on" and "based at least in part on". Similarly, the phrase "depending on" means both "only depending on" and "at least partially depending on". "Obtain" or "acquire" may mean to obtain information from stored information, may mean to obtain information from information received from another node, or may mean to obtain information by generating the information. The terms "include", "comprise" and variations thereof do not mean "include only items stated" but instead mean "may include only items stated" or "may include not only the items stated but also other items". The term "or" used in the present disclosure is not intended to be "exclusive or". Furthermore, any references to elements using designations such as "first" and "second" as used in the present disclosure do not generally limit the quantity or order of those elements. These designations may be used herein as a convenient method of distinguishing between two or more elements. Thus, a reference to first and second elements does not mean that only two elements may be employed there or that the first element needs to precede the second element in some manner. For example, when the English articles such as "a," "an," and "the" are added in the present disclosure through translation, these articles include the plural unless clearly indicated otherwise in context.

Embodiments have been described above in detail with reference to the drawings, but specific configurations are not limited to those described above, and various design change can be made without departing from the gist of the present disclosure.

REFERENCE SIGNS

1: Mobile communication system
10: RAN (NG-RAN/5G RAN)
20: CN (5GC/5G CN)
100: UE
110: Receiver
120: Transmitter
130: Controller
200: gNB
210: Transmitter
220: Receiver
230: Controller
240: Backhaul communicator
300: AMF

The invention claimed is:

1. A communication control method used in a mobile communication system, the communication control method comprising:

receiving, at a base station shared by a plurality of core networks from each of the plurality of core networks, an MBS service identifier indicating an MBS service provided by the corresponding one of the plurality of core networks;

transmitting, at the base station, MBS data belonging to the MBS service to a plurality of user equipments belonging to a plurality of Public Land Mobile Networks (PLMNs) corresponding to the plurality of core networks through multicast or broadcast; and receiving, at the base station from one core network of the plurality of core networks, information indicating whether sharing of a radio resource and/or a core network resource for transmitting the MBS data with another core network is permitted, wherein the MBS service identifier is a unique identifier independent of the plurality of PLMNs.

2. The communication control method according to claim 1, wherein the transmitting comprises transmitting, in response to reception of identical MBS service identifiers at the base station from the plurality of core networks, the MBS data by using a radio resource common to the plurality of PLMNs.

3. The communication control method according to claim 1, wherein the receiving comprises receiving an MBS session start message comprising the MBS service identifier from each of the plurality of core networks.

4. The communication control method according to claim 1, further comprising receiving, at the base station from each of the plurality of core networks, an MBS session identifier corresponding to the MBS service delivered by the corresponding one of the plurality of core networks, wherein the MBS session identifier is an identifier specific to each of the plurality of PLMNs, and wherein the MBS service identifier is an identifier different from the MBS session identifier.

5. The communication control method according to claim 1, further comprising transmitting, at the base station, notification information indicating whether the MBS service is to be provided to one of the plurality of core networks, based on the MBS service identifier received from each of the plurality of core networks.

6. The communication control method according to claim 5, wherein the transmitting the notification information comprises transmitting, in response to reception of identical MBS service identifiers at the base station from the plurality of core networks, the notification information indicating that the MBS service is not to be provided to the one of the plurality of core networks.

7. The communication control method according to claim 1, wherein the transmitting the MBS data comprises transmitting, in response to reception of identical MBS service identifiers from the plurality of core networks and sharing of the radio resource and/or the core network resource being permitted by the plurality of core networks, the MBS data by using the radio resource common to the plurality of PLMNs.

8. A base station shared by a plurality of core networks in a mobile communication system, the base station comprising:

a network communicator configured to receive, from each of the plurality of core networks, an MBS service identifier indicating an MBS service provided by the corresponding one of the plurality of core networks and receive, from one core network of the plurality of core networks, information indicating whether sharing of a radio resource and/or a core network resource for transmitting MBS data with another core network is permitted; and a wireless communicator configured to transmit MBS data belonging to the MBS service to a plurality of user equipments belonging to a plurality of PLMNs corresponding to the plurality of core networks through multicast or broadcast, wherein the MBS service identifier is a unique identifier independent of the plurality of PLMNs.

9. A mobile communication system comprising a base station shared by a plurality of core networks, wherein the base station is configured to receive, from each of the plurality of core networks, an MBS service identifier indicating an MBS service provided by the corresponding one of the plurality of core networks, the base station is configured to transmit MBS data belonging to the MBS service to a plurality of user equipments belonging to a plurality of PLMNs corresponding to the plurality of core networks through multicast or broadcast, and receive, from one core network of the plurality of core networks, information indicating whether sharing of a radio resource and/or a core network resource for transmitting the MBS data with another core network is permitted, and wherein the MBS service identifier is a unique identifier independent of the plurality of PLMNs.

* * * * *